US007609971B1

(12) United States Patent
Zhou

(10) Patent No.: US 7,609,971 B1
(45) Date of Patent: Oct. 27, 2009

(54) ELECTRO OPTICAL SCANNING MULTI-FUNCTION ANTENNA

(75) Inventor: Weimin Zhou, Rockville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 512 days.

(21) Appl. No.: 11/292,114

(22) Filed: Dec. 2, 2005

Related U.S. Application Data

(63) Continuation-in-part of application No. 11/005,623, filed on Dec. 6, 2004.

(51) Int. Cl.
*H04B 10/00* (2006.01)
*H01Q 3/22* (2006.01)

(52) U.S. Cl. ....................................... 398/115; 342/375

(58) Field of Classification Search ................. 398/115; 385/123; 342/375
See application file for complete search history.

(56) References Cited

U.S. PATENT DOCUMENTS 5,051,754 A 9/1991 Newberg
5,333,000 A 7/1994 Hietala et al.
6,114,994 A 9/2000 Soref et al.
6,137,442 A * 10/2000 Roman et al. ............... 342/375
6,208,293 B1 3/2001 Adams et al.
6,295,395 B1 9/2001 Paek
6,313,792 B1 11/2001 Merlet et al.
6,320,539 B1 11/2001 Matthews et al.
6,388,616 B1 5/2002 Zhou
6,393,177 B2 5/2002 Paek
6,452,546 B1 9/2002 Stephens
6,563,966 B1 5/2003 Tang
6,690,325 B1 2/2004 Zhou
2002/0135853 A1* 9/2002 Scalora ....................... 359/248
2002/0180638 A1 12/2002 Stephens
2003/0080899 A1 5/2003 Lee et al.
2003/0133641 A1* 7/2003 Yoo ............................ 385/14

* cited by examiner

*Primary Examiner*—Quan-Zhen Wang
(74) *Attorney, Agent, or Firm*—Williams V. Adams; Guy M. Miller; Alan I. Kalb

(57) ABSTRACT

An multi-beam multifunction electro optical scanning antenna having a first variable wavelength tunable laser having an output wavelength variable within a first range and a second variable wavelength tunable laser having an output wavelength variable within a second range, different from the first range. The outputs from both lasers are modulated by independent microwave sources and the modulated outputs from both lasers are combined by an optical combiner into a combined output signal. An antenna array includes a plurality of radiators and a photodetector is associated with each radiator which converts the combined optical output from the lasers to microwave signals. Beam splitters divide the combined output signals to each of the antenna radiators while first and second wavelength-dependent time delay elements are optically connected in series between each sequential beam splitter. Each first time delay element is operable within the first wavelength range, while each second time delay element is operable within the second wavelength range. The antenna can generate two or more RF microwave beams simultaneously and independently scan/steer them.

8 Claims, 2 Drawing Sheets

ELECTRO OPTICAL SCANNING MULTI-FUNCTION ANTENNA

CROSS REFERENCE TO RELATED APPLICATION

This application is a continuation-in-part of U.S. patent application Ser. No. 11/005,623 filed Dec. 6, 2004.

GOVERNMENT INTEREST

The invention described herein may be manufactured, used, and licensed by or for the United States Government.

FIELD OF THE INVENTION

The present invention relates generally to scanning antennas and, more particularly, to a high frequency, multiple function electro optical scanning antenna.

BACKGROUND OF THE INVENTION

High frequency communication systems as well as radar systems typically use a phased antenna array to control the direction of the electromagnetic transmission. Phased array antennas are inherently narrow band antennas in which the scan angle varies as a function of the true time delay between the microwave radiation from each adjacent antenna element.

In order to control the beam direction of the transmission, the previously known scanning antennas have utilized feed networks that vary either the phase or time delay between the feed point for the antenna and the individual antenna array radiators. A broadside or undeflected beam occurs when the input signal reaches the individual antenna array radiators at the same time and phase. In practice, the beam direction can be varied ±N degrees off center from the broadside direction by varying the phase or time delay of the signal to the individual antenna radiators.

In order to control the direction of the beam transmission from the antenna, many of the previously known antenna arrays have utilized variable phase networks wherein one network is connected between the signal input to the antenna array and each antenna radiator.

In many space critical applications, such as aircraft applications, there have been previous attempts to utilize a single antenna array for multiple functions, such as location radar, Doppler radar and communications. That has been previously accomplished by utilizing the antenna on a time-share basis in which, at any given time, the antenna operates in a single function mode.

These previously known antennas, however, have not proven wholly satisfactory in operation. One disadvantage of utilizing variable phase networks to control the beam direction for the phased antenna array is that the variable phase networks are expensive and this expense increases dramatically as the number of antenna radiators increases.

A still further disadvantage of these previously known variable phase networks is that the previously known systems have utilized switches to selectively connect transmission line sections between the signal input to the antenna and the various antenna radiators. Since each transmission line section introduces a preset time delay or phase shift to its associated antenna radiator, the deflection of the beam from the broadside beam direction is limited to a number of discrete angles relative to the broadside beam direction. Furthermore, the signal losses associated with these switches are unacceptable for many high frequency applications, i.e. applications where the wavelength is in the millimeter range, such as 35 GHz.

A still further disadvantage of these previously known variable phase networks is that the circuitry necessary to affect the variable phase, particularly when a high number of antenna radiators is involved, is necessarily bulky in construction. In many applications, for example when the antenna is used in an aircraft, the space requirements for these previously known systems exceed the available space limitations of the aircraft. This, in turn, necessitates undesirable compromises in the utilization of the available aircraft space.

A still further disadvantage of the previously known multifunction antenna arrays is that the antenna array can only operate in single function mode at any given time. Consequently, since these previously known multifunction antenna arrays cannot operate simultaneously in multiple function mode, the information provided by the antenna inherently involves a time delay. While in some situations such a time delay may be acceptable, in other situations, such as when the antenna is used for Doppler radar, any delay of the information from the antenna caused by the necessary time-sharing requirements of the multiple functions may be unacceptable.

SUMMARY OF THE INVENTION

The present invention provides an electro optical scanning antenna which overcomes all of the above disadvantages of the previously known scanning antennas.

In brief, the scanning antenna of the present invention comprises an antenna array having a plurality of antenna radiators. These antenna radiators are aligned linearly relative to each other so that the antenna radiators are equidistantly spaced from each other. A photodetector is associated with each radiator to provide the microwave signal with controlled time and magnitude of activation of its associated radiator as a function of the optical input to the photodetector.

The scanning antenna further includes a plurality of optical beam splitters with each beam splitter having an input and first and second outputs. Each beam splitter divides the incoming light on its input between the first and second outputs so that a portion of the light entering the input is directed to the first output while the remainder of the light entering the input is directed to the second output.

The second output from the beam splitter is then optically connected via an optical wavelength-dependent time delay element connected in series between the second output of each beam splitter and the input of the beam splitter of the next adjacent radiator. The optical wavelength-dependent time delay element may comprise a photonic bandgap wave guide, optical fiber grating or the like.

A variable wavelength tunable laser, such as a diode laser, provides the time delay or steering control for the antenna. A microwave source modulates the optical output from the laser via an optical modulator and this modulated optical output signal is connected to the input of the first beam splitter at one end of the array. A control circuit controls the operation of the laser to continuously vary the wavelength of the laser within predetermined wavelength limits.

The first output from each beam splitter is optically connected through a fixed time delay element to the photodetector for its associated antenna radiator. The photodetector then converts the optical signal from the laser to a microwave signal used to energize its associated radiator. Furthermore, the predetermined time delay imposed by each time delay element between its associated beam splitter and the radiator varies by a preset time increment between adjacent radiators.

Any conventional means, such as a fiber optical delay line, may be utilized as the fixed time delay element.

No beam splitter is associated with the antenna radiator at the end of the antenna array opposite from the input from the variable frequency laser. Instead, the second output from the last beam splitter is directly connected, through the fixed time delay optical element, to the photodetector for the end radiator.

In operation, the control circuit, by varying the wavelength of the laser, controls the precise time delay of the optical wavelength-dependent time delay element. This, in turn, controls the direction of the radiated beam from the broadside beam direction in the well known fashion. Furthermore, since the direction of the beam is controlled solely in the optical domain, the present invention eliminates the need for the previously known phase shifters as well as their associated circuitry. Therefore, the microwave beam forming can be fully controlled in the optical domain.

Additionally, the amount of light divided by each beam splitter between its first and second outputs may be individually selected and controlled for each antenna radiator which in turn varies the magnitude of the electromagnetic emission from the individual antenna radiators. By proper selection of the beam splitters, the shape of the electromagnetic emission is controlled to shape the electromagnetic emission to eliminate, or at least greatly reduce, side lobes.

In a further preferred embodiment of the present invention, two or more variable wavelength tunable lasers, such as diode lasers, provide the time delays or steering control for the antenna when the antenna is used simultaneously in a multibeam and multifunction mode. Separate microwave sources modulate the optical outputs from the lasers via separate optical modulators and the modulated optical output signals from both lasers are then combined and connected to the input of the first beam splitter at one end of the array. A control circuit controls the operation of the lasers to continuously vary the wavelength of the lasers within predetermined wavelength limits, and the wavelength limits or ranges for the tunable lasers are mutually exclusive of each other.

In order to enable simultaneous multi-beam and multifunction operation of the laser, optical wavelength-dependent time delay elements for both lasers are connected in series between the second output of each beam splitter and the input of the beam splitter of the next adjacent antenna radiator. The optical wavelength-dependent time delay element may comprise a photonic bandgap waveguide, optical fiber grating or the like and each wavelength-dependent time delay element is operational within the wavelength range of its associated lasers. The optical wavelength-dependent time delay elements, however, transmit light without additional delay outside their respective operable range.

In operation, the control circuit, by varying the wavelength of the lasers, simultaneously controls the precise time delay of the optical wavelength-dependent time delay element associated with that tunable laser. Each photodetector, working within its linear range, will generate two RF signals of different frequency that have time delay sequences independent to each other for the two RF signals. This, in turn, simultaneously controls the direction of the radiated beam from the broadside beam direction for each laser in the well known fashion. Furthermore, since the direction of the beam for each function of the antenna is controlled solely in the optical domain independently of each other, the present invention eliminates the need for the previously known phase shifters and the need for the use of time-share strategies when the antenna is used simultaneously for multiple RF beams and multiple functions. The microwave beam forming for each laser is then fully controlled in the optical domain.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which.

DESCRIPTION OF THE PREFERRED EMBODIMENT

Figure 2:
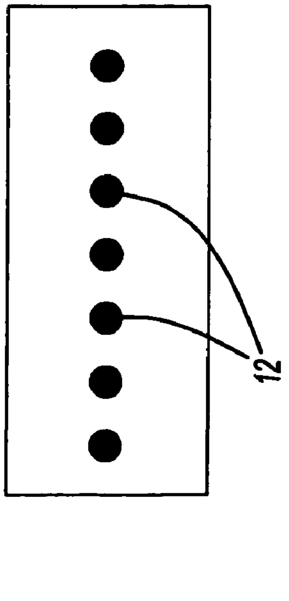
FIG. 2 is a plan view illustrating an exemplary antenna array.

With reference first to FIG. 2, a plan view of an exemplary electro optical scanning antenna array 10 is illustrated as having a plurality of antenna radiators 12. The antenna radiators 12 are linearly aligned with each other and are preferably equidistantly spaced from each other. Although the antenna array 10 illustrated in FIG. 2 depicts seven antenna radiators 12, it will be understood that fewer or more antenna radiators 12 may be utilized in the array 10 without deviation from either the spirit or scope of the invention.

Figure 1:
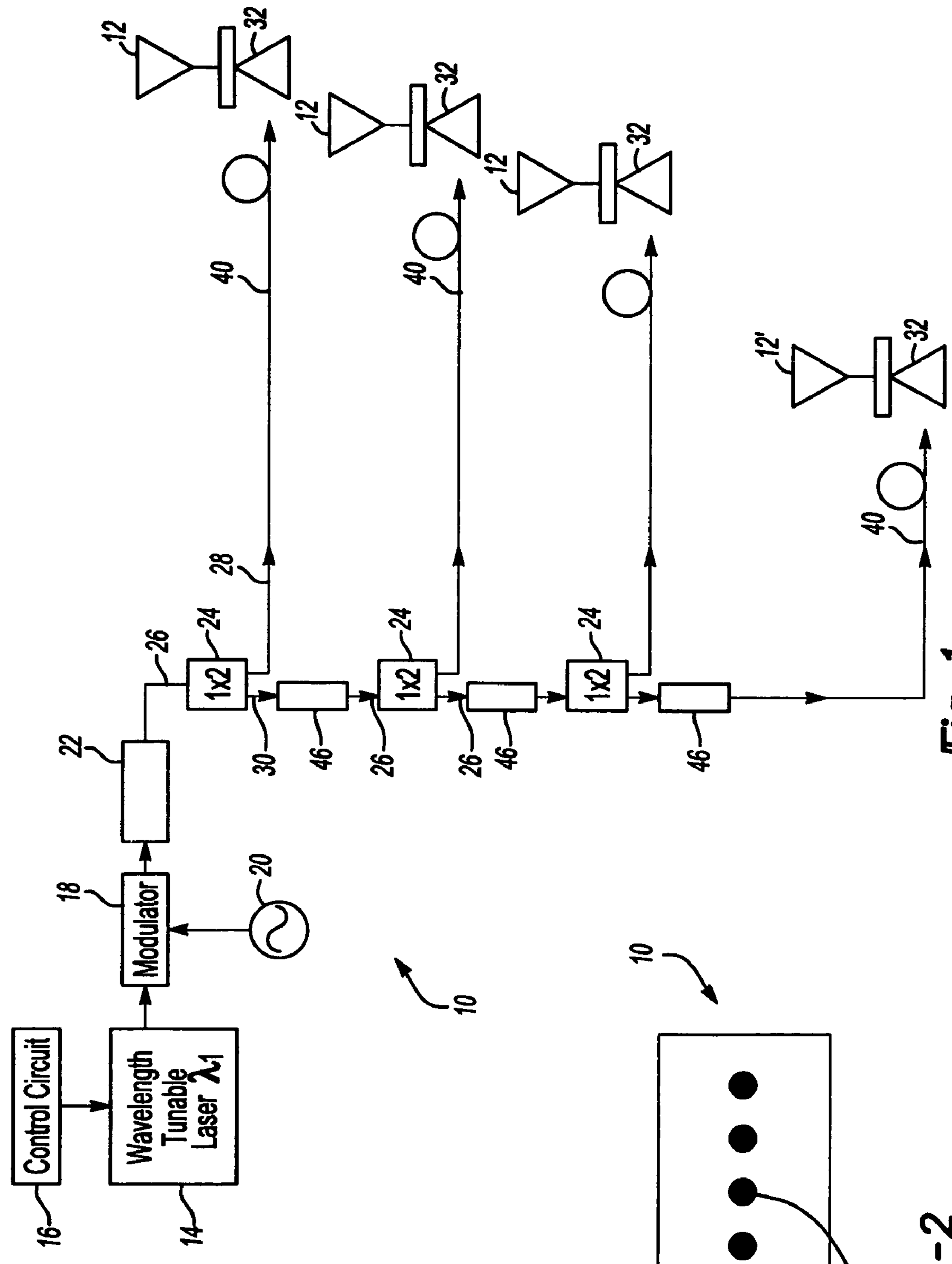
FIG. 1 is a block diagrammatic view illustrating a preferred embodiment of the present invention.

With reference now to FIG. 1, a block diagrammatic schematic view of the electro optical scanning antenna of the present invention is illustrated. The scanning antenna includes a wavelength tunable laser 14, such as a diode laser. A control circuit 16 controls the operation of the laser 14 to continuously vary the wavelength of the laser 14 within a predetermined range with a center wavelength of $\lambda_1$.

The laser 14 has its output optically coupled to an optical amplitude modulator 18. The modulator 18 receives an input signal from a microwave frequency source 20, e.g. 35 GHz, to modulate the output from the laser 14. Alternatively, the laser 14 may be directly amplitude modulated by the microwave source 20.

The modulated optical signal from the laser 14 is then optically coupled through an amplifier 22 such that the output from the amplifier 22 comprises a microwave frequency amplitude modulated optical signal at a wavelength determined by the control circuit 16.

Still referring to FIG. 1, the antenna 10 comprises a plurality of optical beam splitters 24 wherein each beam splitter 24 includes an input 26, a first output 28 and a second output 30. For a reason to be subsequently described in greater detail, the magnitude of the light divided by each beam splitter 24 between its outputs 28 and 30 is selected to shape the emission from the array 10.

The first output 28 from each beam splitter 24 is optically coupled through a fixed time delay optical element 40, such as an optical delay line, to an optical detector 32, such as a photodetector, associated with each radiator 12. Each optical detector converts the optical signal received from the laser 14 via its associated fixed time delay optical element 40 to a microwave signal which is amplified by a microwave amplifier as needed and electrically connected to its associated radiator 12. However, even though the time delay imposed by each time delay element 40 is fixed between each beam splitter 24 and its associated optical detector 32, the time delay imposed by each time delay element 40 varies by a fixed amount from one end of the antenna array and to its other end. Preferably, each time delay element 40 comprises a fiber optic and the time delay imposed by each time delay element 40 is achieved by varying the length of the fiber optic from the radiator 12 of one end of the antenna array 10 and to its other end to provide the initial time delay compensation for zero angle steering.

Still referring to FIG. 1, an optical wavelength-dependent time delay element 46 is optically coupled in series between the second output 30 of each beam splitter 24 and the input 26 on the beam splitter 24 for the next adjacent antenna radiator 12. Each optical wavelength-dependent time delay element 46 is substantially identical to each other and may comprise a photonic bandgap waveguide or an optical fiber grating used in the transmission mode. In either event, the optical wavelength-dependent time delay elements 46 impose a time delay on the signal between adjacent beam splitters 24 and thus between adjacent radiators 12 in the antenna array 10.

A beam splitter 24 is associated with each antenna radiator 12 except for the antenna radiator 12' at the end of the antenna array 12. Instead, the output from the last or end optical wavelength-dependent time delay element 46 is directly coupled via the fixed time delay element 40 to the optical detector 32 for the end radiator 12'.

Assuming that the antenna array 10 includes N radiators 12, during a broadside or undeflected beam condition at a preset wavelength $\lambda_c$, the optical wavelength-dependent time delay elements 46 as well as the fixed initial time delay elements 40 are each selected so that the activation of each optical detector 32, and thus the emission of microwave radiation from each radiator 12, occurs simultaneously (or in phase). In order to deflect the beam in one direction, the control circuit 16 varies the wavelength of the laser 14 in a first direction. This, in turn, varies the time delay for the optical wavelength-dependent time delay elements 46 such that the activation of the optical detector 32, and thus the emission of radiation from the radiators 12, occurs at temporally offset times relative to each other thus deflecting the beam from its broadside direction in the well known fashion. Conversely, tuning of the wavelength of the laser output 14 by the control circuit 16 in the opposite direction varies the deflection of the beam in the opposite direction.

Since the wavelength of the laser 14 may be continuously variably controlled by the control circuit 16 within preset limits, the deflection of the emitted beam from the antenna array 10 may be continuously varied between the limits of deflection of the emitted radiation.

Additionally, since the division of light by each beam splitter 24 between its outputs 28 and 30 is individually selected for each optical detector 32, and thus each antenna radiator 12, the magnitude of emission from each radiator 12 is varied as desired to shape the emitted radiation from the antenna array 10. This in turn allows side lobes from the antenna emission to be eliminated or at least reduced. The actual selection of the division of the magnitude of light by each beam splitter will vary as a function of the number of radiators 12 in the antenna array.

A still further advantage of the present invention is that, since the beam steering is achieved solely in the optical domain, it is independent of the microwave frequency of the antenna. As such, it may be used at different microwave frequencies without modification.

Figure 3:
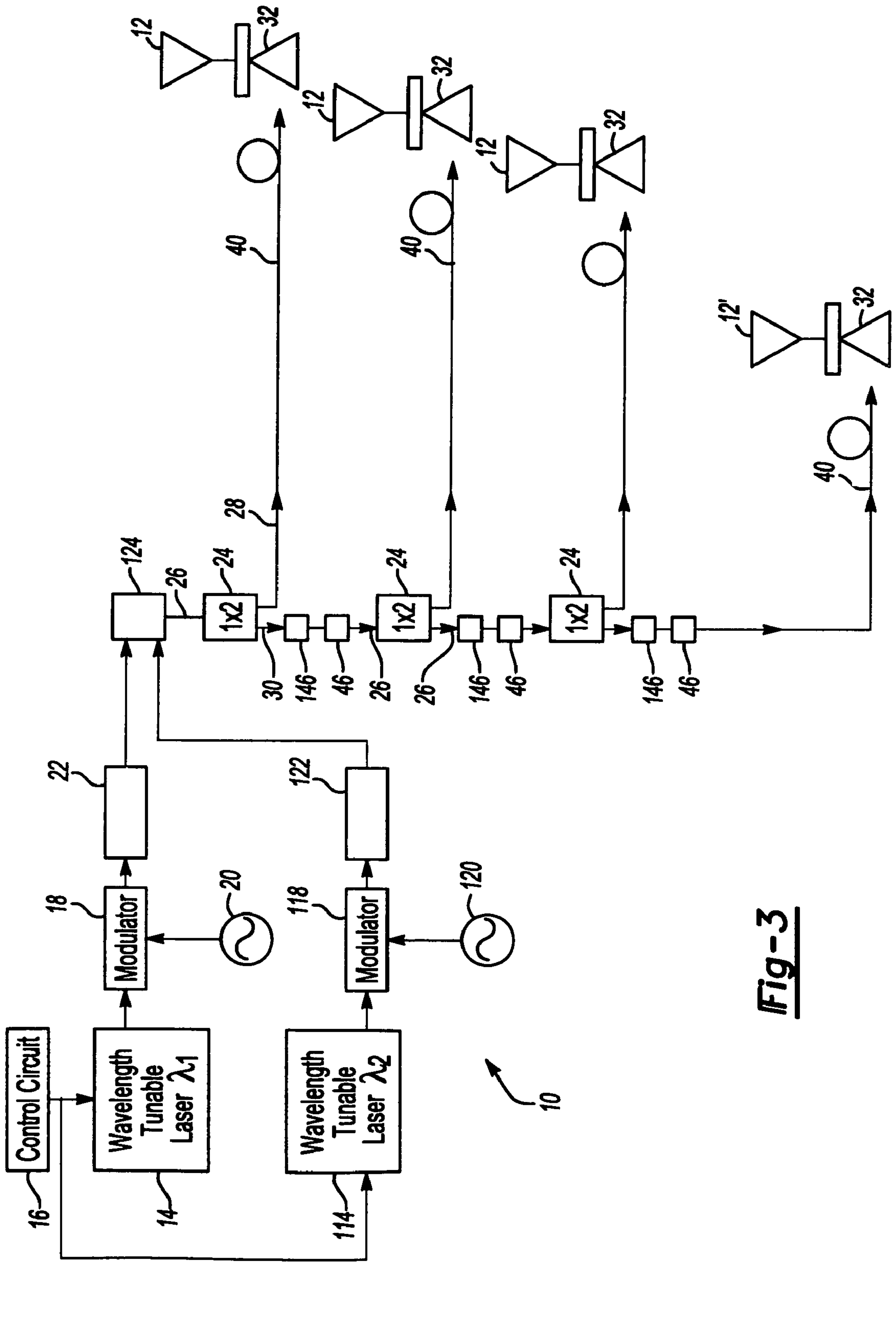
FIG. 3 is a block diagrammatic view similar to FIG. 1, but illustrating a second preferred embodiment of the present invention.

With reference now particularly to FIG. 3, a second preferred embodiment of the present invention is shown for an exemplary electro optical scanning antenna operable simultaneously in multifunction mode. The embodiment of the invention illustrated in FIG. 3 differs from that illustrated in FIG. 1 in that it includes a second wavelength tunable laser 114, such as a diode laser. The control circuit 16 also controls the operation of the second laser 114 to continuously vary the wavelength of the second laser 114 within a second predetermined range with a center wavelength of 2. Furthermore, the range of variation of the wavelength of the second laser 114 is mutually exclusive from the range of the first laser 14. In addition, although the control circuit 16 is illustrated as controlling the wavelength of both lasers 14 and 114, alternatively, separate control circuits may be used for each laser 14 and 114.

The second laser 114 has its output optically coupled to an optical amplitude modulator 118. The modulator 118 receives an input signal from a microwave source 120, which is different than the frequency of the first microwave source 20, to modulate the output from the second laser 114. However, all the microwave frequencies are chosen within the antenna bandwidth. Alternatively, the second laser 114 may be directly amplitude modulated by the microwave source 120.

The modulated optical signal from the second laser 114 is then coupled as an input to an amplifier 122 so that the output from the second amplifier 122 comprises a microwave frequency amplitude modulated optical signal at a wavelength that is determined by the control circuit 16 and modulated at the frequency determined by the microwave frequency source 120.

The modulated and amplified output from both the first amplifier 22 as well as the second amplifier 122 are coupled as input signals to an optical signal combiner 124. An output from the optical signal combiner 124 is then coupled to the input 26 of the first beam splitter 24. Consequently, the input signal to the first beam splitter 24 comprises two, or even more, independent modulated optical signals, each operating on the mutually exclusive optical wavelengths and each independently modulated by their respective microwave sources 20 and 120.

Still referring to FIG. 3, the optical wavelength-dependent time delay elements 46 are each operable to impose a variable time delay only on optical signals within the variable wavelength range of the first tunable laser 14. Optical signals having a wavelength outside the variable wavelength range of the first tunable laser 14, however, pass through the optical time delay element 46 without delay (other than the normal delay of light traveling through a light transmissive material).

A second optical wavelength-dependent time delay element 146 is optically connected in series with each of the first time delay elements 46 so that two time delay elements 46 and 146 are optically connected in series between each adjacent band splitter 24. The second time delay element 146, however, differs from the first time delay element 46 in that the second time delay elements 146 are each operable to impose a variable time delay only on optical signals within the variable range of the second tunable laser 114. The time delay element 146, however, passes optical signals without delay for optical wavelengths outside its operable range (other than the normal delay of light traveling through a light transmissive material).

In operation, the combined modulated output signals from both lasers 14 and 114 are simultaneously delivered by the beam splitters 24 to the antenna radiators 12 in the previously described fashion. Furthermore, the control circuit 16 independently controls the steering signal for each tunable laser 14 and 114 so that the signals from the microwave sources 20 and 120 are both steered and radiated from the radiators 12 simultaneously and independently of each other. This in turn enables the single antenna 12 to be operated simultaneously and continuously in a multi-beam and multifunction mode, e.g. both as location radar and Doppler radar, communications and the like.

Although the second embodiment of the invention is illustrated in FIG. 3 as having two tunable lasers 14 and 114, it will be understood that three or even more tunable lasers may be used to simultaneously transmit radio signals on the same antenna radiators 12. In order to add more RF beams for additional functions to the electro optical antenna, it is only necessary to add additional tunable lasers with their modulating circuit as well as variable time delay elements between the beam splitters 24 that are operable within the range of the newly added tunable lasers. The additional tunable lasers, however, must have a range of wavelength variation that is mutually exclusive of the other tunable lasers.

From the foregoing, it can be seen that the present invention provides an electro optical scanning antenna which is simple yet effective in construction and which provides control of the beam deflection direction and beam forming solely in the optical domain and without the need for the previously known phase shifters and switches to control beam deflection. Furthermore, the present invention achieves enhanced shaping of the emitted radiation.

Additionally, the present invention provides an electro optical scanning antenna that may be simultaneously and independently operated in multi-beam and multifunction mode.

Having described my invention, however, many modifications thereto will become apparent to those skilled in the art to which it pertains without deviation from the spirit of the invention as defined by the scope of the appended claims.

I claim:

1. An electro optical scanning antenna comprising:

a first variable wavelength tunable laser having an output wavelength variable within a first range, a first microwave source which amplitude modulates an optical output from said first laser via a first optical modulator and produces a modulated first output, a second variable wavelength tunable laser having an output wavelength variable within a second range, said second range being mutually exclusive of said first range, a second microwave source which amplitude modulates an optical output from said second laser via a second optical modulator and produces a modulated second output, an optical combiner which combines said first and second modulated laser outputs into a combined output signal, a control circuit which controls the wavelength of said lasers, an antenna array having a plurality of radiators aligned adjacent each other, a photodetector associated with each said radiator to convert the combined optical output from said lasers to microwave signals, each said microwave signals being connected to its associated radiator, a plurality of optical beam splitters, each beam splitter having an input and a first and a second output so that a portion of light entering said input is directed to said first output and the remainder of the light entering said input is directed to said second output, said first output of each beam splitter being optically coupled to one of said optical detectors, a plurality of first optical wavelength-dependent time delay elements operable within said first range and a plurality of second optical wavelength-dependent time delay elements operable within said second range, one of said first optical wavelength-dependent time delay elements and one of said second optical wavelength-dependent time delay elements being optically connected in series between the second output of each beam splitter and said input of the beam splitter associated with the adjacent radiator, said combined output signal being optically coupled to said input of the first beam splitter.

2. The invention as defined in claim 1 wherein said first and second optical wavelength-dependent time delay element each comprises a photonic bandgap waveguide, or an optical waveguide having highly wavelength-dependent dispersion properties.

3. The invention as defined in claim 1 wherein said first and second optical wavelength-dependent time delay elements each comprises an optical fiber grating used in transmission mode.

4. The invention as defined in claim 1 and comprising an optical time delay element having a predetermined time delay optically connected in series between said first output of each beam splitter and said photodetector for its associated radiator.

5. The invention as defined in claim 4 wherein said predetermined time delay varies by a preset time increment between adjacent radiators.

6. The invention as defined in claim 4 wherein said optical time delay element comprises an optical delay line.

7. The invention as defined in claim 1 wherein said first optical wavelength-dependent time delay elements are each substantially identical to each other and wherein said second optical wavelength-dependent time delay elements are each substantially identical to each other.

8. The invention as defined in claim 1 with N antenna element where the modulated light from the wavelength tunable laser is sent into N−1 identical wavelength-dependent time delay elements in series by cascading the elements, wherein before each pair of said first and second wavelength-dependent time delay elements, a desired amount of light signal is tapped by an optical beam splitter and sent into the corresponding photodetector via a fixed initial delay line whereby N is an integer greater than 2.

* * * * *